US012322312B2

(12) United States Patent
Wang

(10) Patent No.: US 12,322,312 B2
(45) Date of Patent: Jun. 3, 2025

(54) DRIVING METHOD OF GOA CIRCUIT, GATE DRIVER, AND DISPLAY PANEL

(71) Applicant: Wuhan China Star Optoelectronics Technology Co., Ltd., Hubei (CN)

(72) Inventor: Lifang Wang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/771,897

(22) PCT Filed: Apr. 18, 2022

(86) PCT No.: PCT/CN2022/087292
§ 371 (c)(1),
(2) Date: May 28, 2024

(87) PCT Pub. No.: WO2023/178772
PCT Pub. Date: Sep. 28, 2023

(65) Prior Publication Data

US 2025/0078709 A1 Mar. 6, 2025

(30) Foreign Application Priority Data

Mar. 24, 2022 (CN) ......................... 202210297503.4

(51) Int. Cl.
*G09G 3/20* (2006.01)

(52) U.S. Cl.
CPC ..................................... *G09G 3/20* (2013.01)

(58) Field of Classification Search
CPC ...................................................... G09G 3/20
See application file for complete search history.

(56) References Cited

U.S. PATENT DOCUMENTS 8,970,564 B2 * 3/2015 Moon .................. G09G 3/3648 345/204
2013/0222359 A1 8/2013 Nakata
2015/0062034 A1 * 3/2015 Kim .................... G06F 3/04166 345/173
(Continued)

FOREIGN PATENT DOCUMENTS

CN 101916540 12/2010
CN 105185347 12/2015
(Continued)

OTHER PUBLICATIONS

International Search Report and the Written Opinion Dated Nov. 28, 2022 From the International Searching Authority Re. Application No. PCT/CN2022/087292 and Its Translation Into English. (19 Pages).
(Continued)

*Primary Examiner* — Sejoon Ahn

(57) ABSTRACT

A driving method of a gate driver on array (GOA) circuit, a gate driver, and a display panel are provided to reduce a time period of a gate signal rising from a first low potential to a first high potential, so that pixel units can be charged faster and earlier and a charging rate of the pixel units can be improved. In addition, a time period for the gate signal to fall from the first high potential to the first low potential can be reduced. As a result, the pixel units can be turned off faster and earlier, so that a risk of wrong charging of the pixel units is reduced.

12 Claims, 6 Drawing Sheets

(56) References Cited

U.S. PATENT DOCUMENTS

2015/0103037 A1* 4/2015 Wu ........................ G06F 3/0412
345/80

FOREIGN PATENT DOCUMENTS

| | | |
|---|---|---|
| CN | 105869601 | 8/2016 |
| CN | 106782408 | 5/2017 |
| CN | 108172187 | 6/2018 |
| CN | 109686330 | 4/2019 |
| CN | 111028803 | 4/2020 |
| CN | 113990235 | 1/2022 |

OTHER PUBLICATIONS

Notification of Office Action and Search Report Dated Mar. 6, 2023 From the State Intellectual Property Office of the People's Republic of China Re. Application No. 202210297503.4 and Its Translation Into English. (18 Pages).

* cited by examiner

DRIVING METHOD OF GOA CIRCUIT, GATE DRIVER, AND DISPLAY PANEL

RELATED APPLICATIONS

This application is a National Phase of PCT Patent Application No. PCT/CN2022/087292 having International filing date of Apr. 18, 2022, which claims the benefit of priority of Chinese Patent Application No. 202210297503.4 filed on Mar. 24, 2022. The contents of the above applications are all incorporated by reference as if fully set forth herein in their entirety.

FIELD AND BACKGROUND OF THE INVENTION

The present application relates to a technical field of displays, and particularly to a driving method of a gate driver on array (GOA) circuit, a gate driver, and a display panel.

As shown in FIG. 1, when gate driver on array (GOA) circuits provide gate signals to scan lines to turn on each row of pixel units, due to a resistance-capacitance (RC) loading of the scan lines, the gate signals have distortion delays. That is, a rise time Tr1 of a gate signal (scanning signal) received by each pixel unit from a turn-off potential VGL to a turn-on potential VGH is not 0. When a row of pixel units is turned off, a fall time Tf1 of the gate signal falling from the turn-on potential VGH to 0 is also not 0. In addition, the closer a distance from the pixel unit to the GOA circuit is, the shorter the rise time Tr1 and the fall time Tf1 of the gate signal received by the pixel unit is, and the farther the distance from the pixel unit to the GOA circuit is, the longer the rise time Tr1 and the fall time Tf1 of the gate signal received by the pixel unit is. That is, it takes a certain amount of time to turn on and turn off each row of pixel units, and the closer the distance from the pixel unit to the GOA circuit is, the shorter the time required to turn on and off is, and the farther the distance from the pixel unit to the GOA circuit is, the longer the time required to turn on and off is.

When refresh rates of display panels are determined, a charging time of each row of pixel units if fixed, t=1/refresh rate. As size and resolution of the display panels increase, the charging time of each row of pixel units decreases, and a charging rate decreases. In the display panels, after gate signals turn on each row of pixel units, source signals provided by source driver ICs simultaneously charge each pixel unit of each row of pixel units. Therefore, for a same row of pixel units, it takes longer to turn on and off the pixel units far from the GOA circuit, and an actual charging time will be reduced, resulting in differences in brightness of pixel units with different distances from the GOA circuit and poor display uniformity of the display panels. Furthermore, with wide applications of long horizontal panels, this problem is getting more and more serious.

Therefore, it is necessary to provide a driving method of the GOA circuit to reduce turn-on and turn-off times of each row of pixel units, thus increasing an actual charging time of each row of the pixel units and improving display uniformity of a display panel.

SUMMARY OF THE INVENTION

In order to solve the above-mentioned problem, embodiments of the present invention provide a driving method of a gate driver on array (GOA) circuit, a gate driver, and a display panel.

In a first aspect, an embodiment of the present invention provides a driving method of a GOA circuit, including: enabling a gate signal to rise sequentially from a first low potential to a first high potential and a second high potential within a first preset time period in a turn-on phase of each of rows of pixel units. The second high potential is higher than the first high potential, and the first high potential is higher than the first low potential. Specifically, the first preset time period is a time period required for the gate signal to rise from the first low potential to the first high potential at a highest level, and the first high potential is a turn-on potential of each of the pixel units, and the first low potential is the turn-off potential of each of the pixel units.

In some embodiments, the driving method of the GOA circuit further includes enabling the gate signal to fall from the second high potential to a second low potential and then rise from the second low potential to the first low potential within a second preset time period in a turn-off phase of each row of the pixel units, wherein the second low potential is lower than the first low potential. The second preset time period is a time period required for the gate signal to fall from the first high potential to the first low potential at a lowest level.

In some embodiments, the driving method of the GOA circuit further includes: between the turn-on phase and the turn-off phase of each row of the pixel units and prior to enabling the gate signal to fall from the second high potential to the first low potential, the driving method further including enabling the gate signal to remain at the first high potential for a third preset time period after the gate signal falls from the second high potential to the first high potential. The third preset time period is a charging time period for thoroughly turning on each of the pixel units.

In some embodiments, the driving method of the GOA circuit further includes enabling the gate signal to rise from the second low potential to the first low potential after the turn-off phase of each row of the pixel units.

In some embodiments, the first high potential ranges from 20V to 35V and the first low potential ranges from −5V to −10V.

In some embodiments, thin-film transistors included in the GOA circuit are each an N-type thin-film transistor.

In a second aspect, an embodiment of the present invention further provides a gate driver, and the gate driver includes a gate driver on array (GOA) circuit configured to output a gate signal. During the outputting of the gate signal, the gate driver is configured to enable the GOA circuit to enable the gate signal to rise sequentially from a first low potential to a first high potential and a second high potential within a first preset time period in a turn-on phase of each of rows of pixel units. Specifically, the second high potential is higher than the first high potential, and the first high potential is higher than the first low potential. The first preset time period is a time period required for the gate signal to rise from the first low potential to the first high potential at a highest level, and the first high potential is a turn-on potential of each of the pixel units, and the first low potential is the turn-off potential of each of the pixel units.

In some embodiments, during the outputting of the gate signal, the gate driver is configured to enable the GOA circuit to enable the gate signal to fall from the second high potential to the first low potential and a second low potential in sequence within a second preset time period in a turn-off phase of each row of the pixel units. Specifically, the second low potential is lower than the first low potential, and the second preset time period is a time period required for the gate signal to fall from the first high potential to the first low potential at a lowest level.

In some embodiments, during the outputting of the gate signal, in the turn-off phase of each row of the pixel units and prior to the gate signal being enabled to fall from the second high potential to the first low potential, the gate driver is further configured to enable the GOA circuit to enable the gate signal to remain at the first high potential for a third preset time period after the gate signal falls from the second high potential to the first high potential. Specifically, the third preset time period is a charging time period for thoroughly turning on each of the pixel units.

In some embodiments, during the outputting of the gate signal, the gate driver is further configured to enable the GOA circuit to enable the gate signal to rise from the second low potential to the first low potential after the turn-off phase of each row of the pixel units.

In some embodiments, the first high potential ranges from 20V to 35V and the first low potential ranges from −5V to −10V.

In a third aspect, an embodiment of the present invention further provides a display panel including the gate driver as described above. The gate driver includes a GOA circuit for outputting a gate signal. During the GOA circuit is enabled to output the gate signal, the gate driver is configured to enable the gate signal to rise sequentially from a first low potential to a first high potential and a second high potential within a first preset time period in a turn-on phase of each of rows of pixel units. Specifically, the second high potential is higher than the first high potential, and the first high potential is higher than the first low potential. Specifically, the first preset time period is a time period required for the gate signal to rise from the first low potential to the first high potential at a highest level, and the first high potential is a turn-on potential of each of the pixel units, and the first low potential is the turn-off potential of each of the pixel units.

In some embodiments, during the outputting of the gate signal, the gate driver is configured to enable the GOA circuit to enable the gate signal to fall from the second high potential to the first low potential and a second low potential in sequence within a second preset time period in a turn-off phase of each row of the pixel units. Specifically, the second low potential is lower than the first low potential, and the second preset time period is a time period required for the gate signal to fall from the first high potential to the first low potential at a lowest level.

In some embodiments, during the outputting of the gate signal, in the turn-off phase of each row of the pixel units and prior to the gate signal being enabled to fall from the second high potential to the first low potential, the gate driver is further configured to enable the GOA circuit to enable the gate signal to remain at the first high potential for a third preset time period after the gate signal falls from the second high potential to the first high potential. Specifically, the third preset time period is a charging time period for thoroughly turning on each of the pixel units.

In some embodiments, during the outputting of the gate signal, the gate driver is further configured to enable the GOA circuit to enable the gate signal to rise from the second low potential to the first low potential after the turn-off phase of each row of the pixel units.

In some embodiments, the first high potential ranges from 20V to 35V and the first low potential ranges from −5V to −10V.

In some embodiments, thin-film transistors included in the GOA circuit are each an N-type thin-film transistor.

The present application has advantageous effects as follows: in the driving method of the GOA circuit, the gate driver, and the display panel provided by the embodiments of the present invention, within the first preset time period required for the gate signal to rise from the first low potential to the first high potential, the gate signal is enabled to rise from the first low potential to the first high potential and the second high potential sequentially, thereby reducing a time period for the gate signal to rise from the first low potential to the first high potential. As a result, the pixel units in the display area of the display panel can be charged faster and earlier, thereby improving a charging rate of the pixel units. Likewise, within the second preset time period required for the gate signal to fall from the first high potential to the first low potential, the gate signal is enabled to rise from the second low potential to the first low potential after falling from the first high potential to the second low potential, thereby reducing a time period for the gate signal to fall from the first high potential VGH1 to the first low potential. As a result, the pixel units in the display area of the display panel can be turned off faster and earlier, thereby reducing a risk of wrong charging of the pixel units.

DESCRIPTION OF SPECIFIC EMBODIMENTS OF THE INVENTION

In order to make the objectives, technical solutions and effects of the present application clearer and clearer, the present application will be described in further detail below with reference to the accompanying drawings and examples. It should be understood that the specific embodiments described here are only used to illustrate the present application, and are not used to limit the present application.

Figure 1:
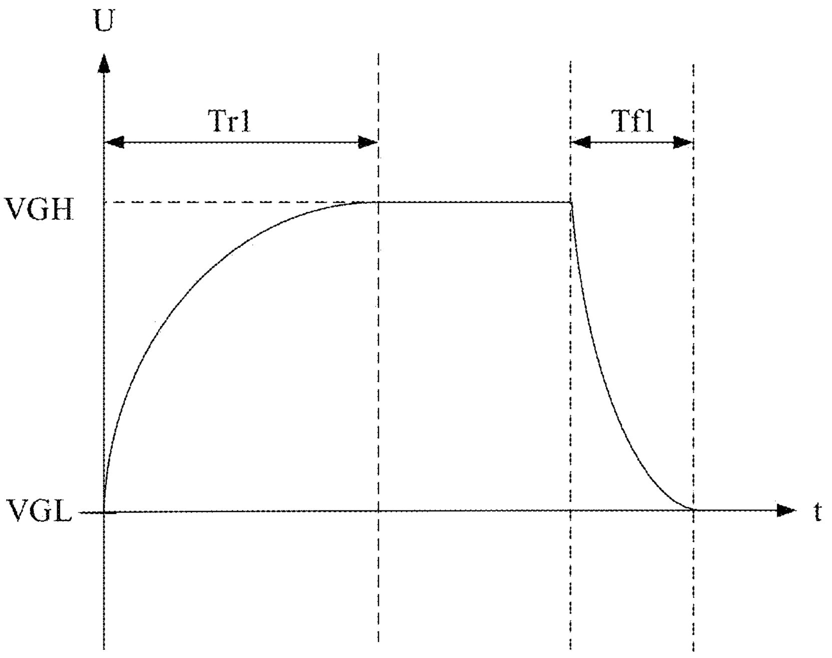
FIG. 1 (Prior Art)
FIG. 1 is a conventional timing diagram of a gate signal.
Figure 2:
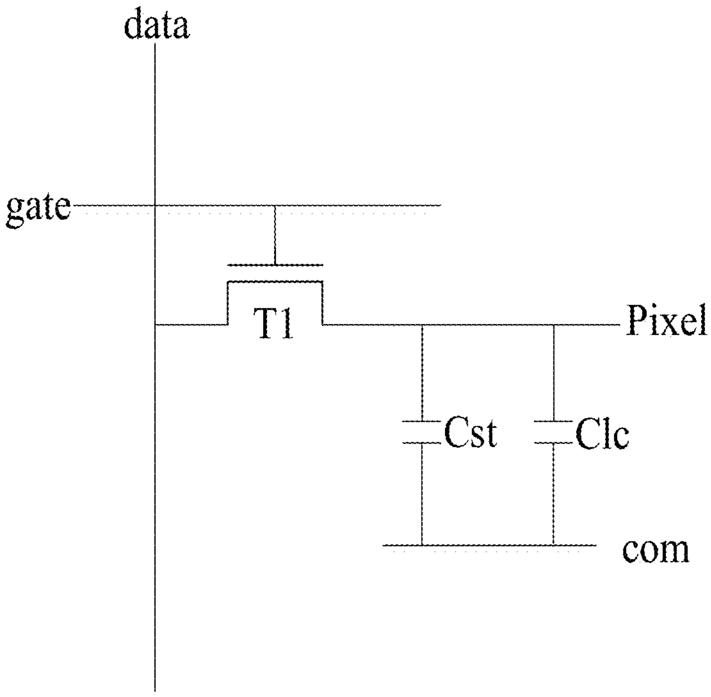
FIG. 2 (Prior Art)
FIG. 2 is a schematic structural view of a conventional 1T2C liquid crystal display (LCD) pixel unit driving circuit.
Figure 3:
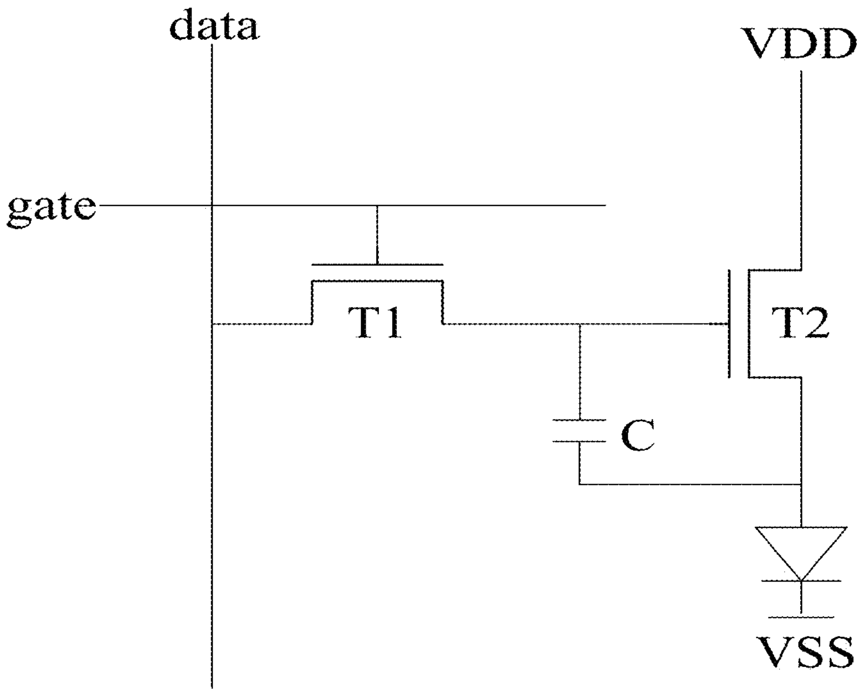
FIG. 3 (Prior Art)
FIG. 3 is a schematic structural view of a conventional 2T1C organic light-emitting diode (OLED) pixel unit driving circuit.

It should be noted that when a gate driver on array (GOA) circuit of a gate driver outputs a gate signal to a row of pixel units, the row of pixel units is turned on, and then a source driver synchronously inputs data signals to the row of pixel units through a plurality of data lines. That is, in a conventional 1T2C liquid crystal display (LCD) pixel unit driving circuit shown in FIG. 2 (T1 is a write transistor, Cst is a storage capacitor, and Clc is a liquid crystal capacitor), or in a 2T1C organic light-emitting diode (OLED) pixel unit driving circuit shown in FIG. 3 (T1 is a write transistor, T2 is a driving transistor, and C is a storage capacitor), a gate of the write transistor T1 is turned on under the control of a gate signal, and then the pixel unit is charged by a data line through the write transistor. That is, a turn-on phase of the pixel unit refers to a process of turning on the write transistor of a pixel unit driving circuit in the pixel unit, and a turn-off phase of the pixel unit is a process of turning off the write transistor of the pixel unit driving circuit in the pixel unit. It should be noted that, in the embodiments of the present invention, a writing transistor is an N-type thin-film transistor as an example for description.

It should further be noted that a turn-on potential of each pixel unit is a potential at which the write transistor of the pixel unit driving circuit in the pixel unit is thoroughly turned on. But in fact, a turn-on process of each pixel unit is not transient. If the write transistor T1 is an N-type thin-film transistor, when a gate-source potential Vgs of the write transistor T1>a threshold voltage Vth of the write transistor, the write transistor T1 is already turned on, until a gate potential of the write transistor T1 reaches a first high potential VGH1, the writing transistor T1 is thoroughly turned on; Likewise, a turn-off potential of each pixel unit is a potential at which the write transistor of the pixel unit driving circuit in the pixel unit is thoroughly turned off. A turn-off process of each pixel unit is also not transient. When the gate-source potential Vgs of the write transistor T1≤the threshold voltage Vth of the write transistor, the write transistor T1 is already turned off, until the gate potential of the write transistor T1 reaches a first low potential VGL1, the write transistor T1 is thoroughly turned off. That is, the first high potential VGH1 is the turn-on potential of the write transistor T1, and the first low potential VGL1 is the turn-off potential of the write transistor T1.

Figure 4:
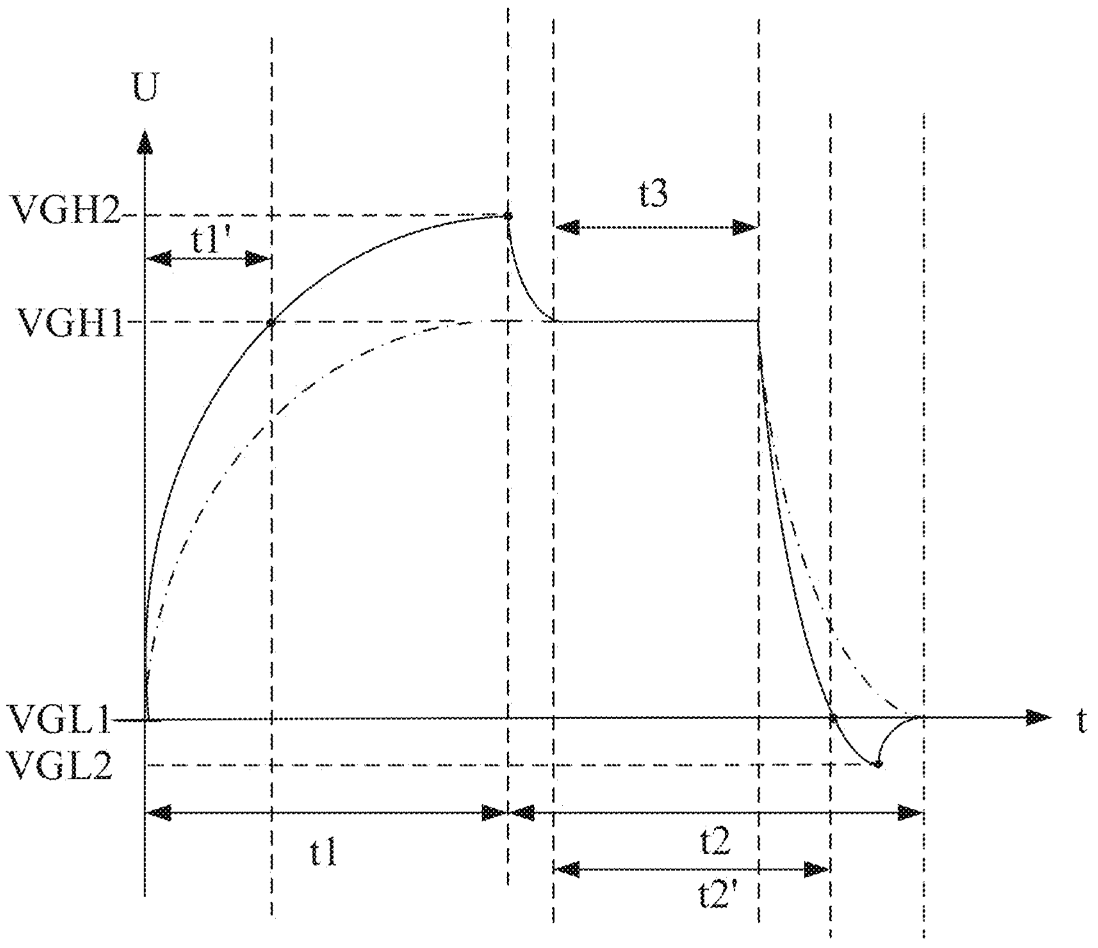
FIG. 4 is a first schematic timing diagram of a gate signal in a driving method a GOA circuit provided by an embodiment of the present invention.
Figure 5:
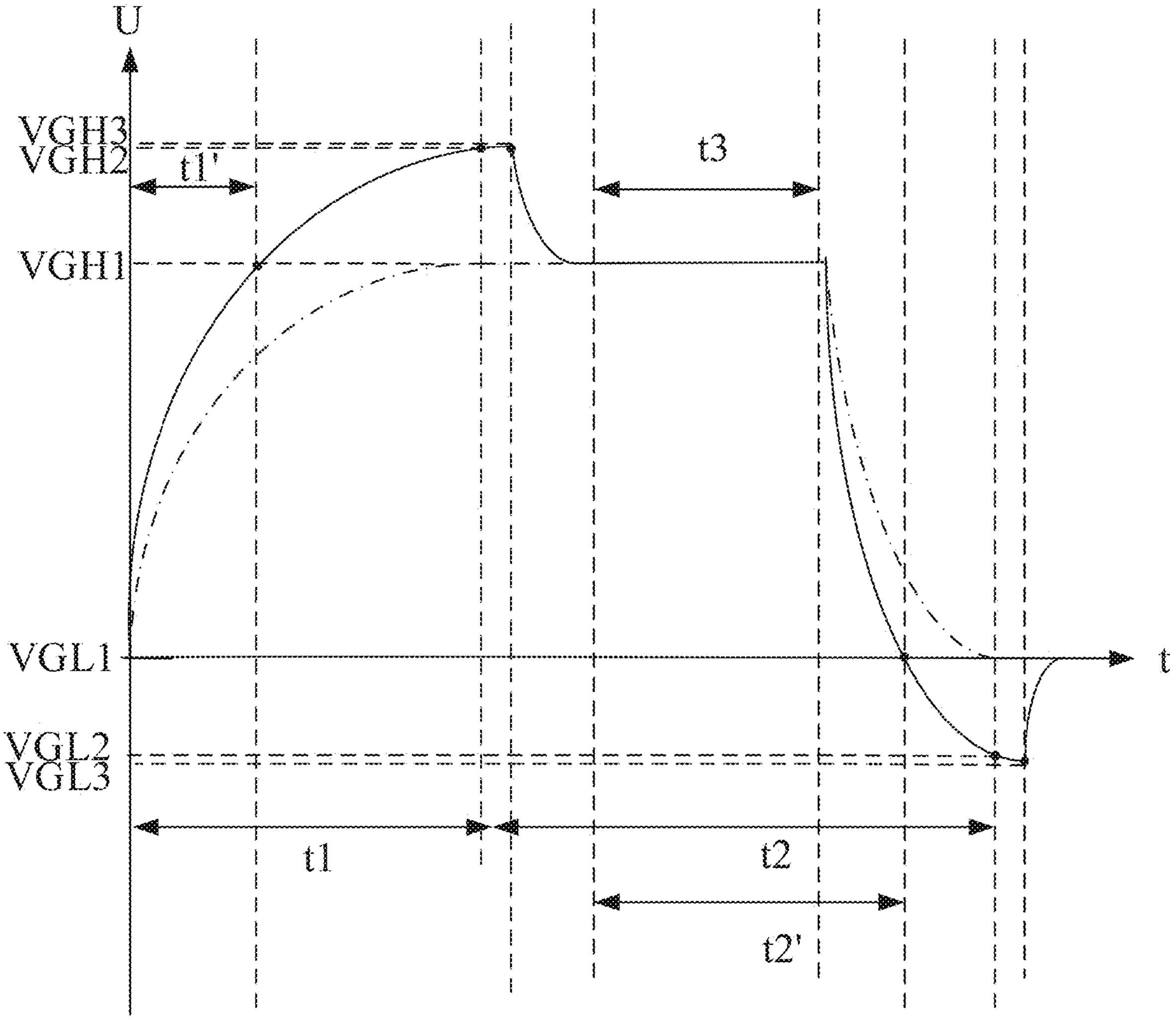
FIG. 5 is a second schematic timing diagram of a gate signal in a driving method a GOA circuit provided by an embodiment of the present invention.
Figure 6:
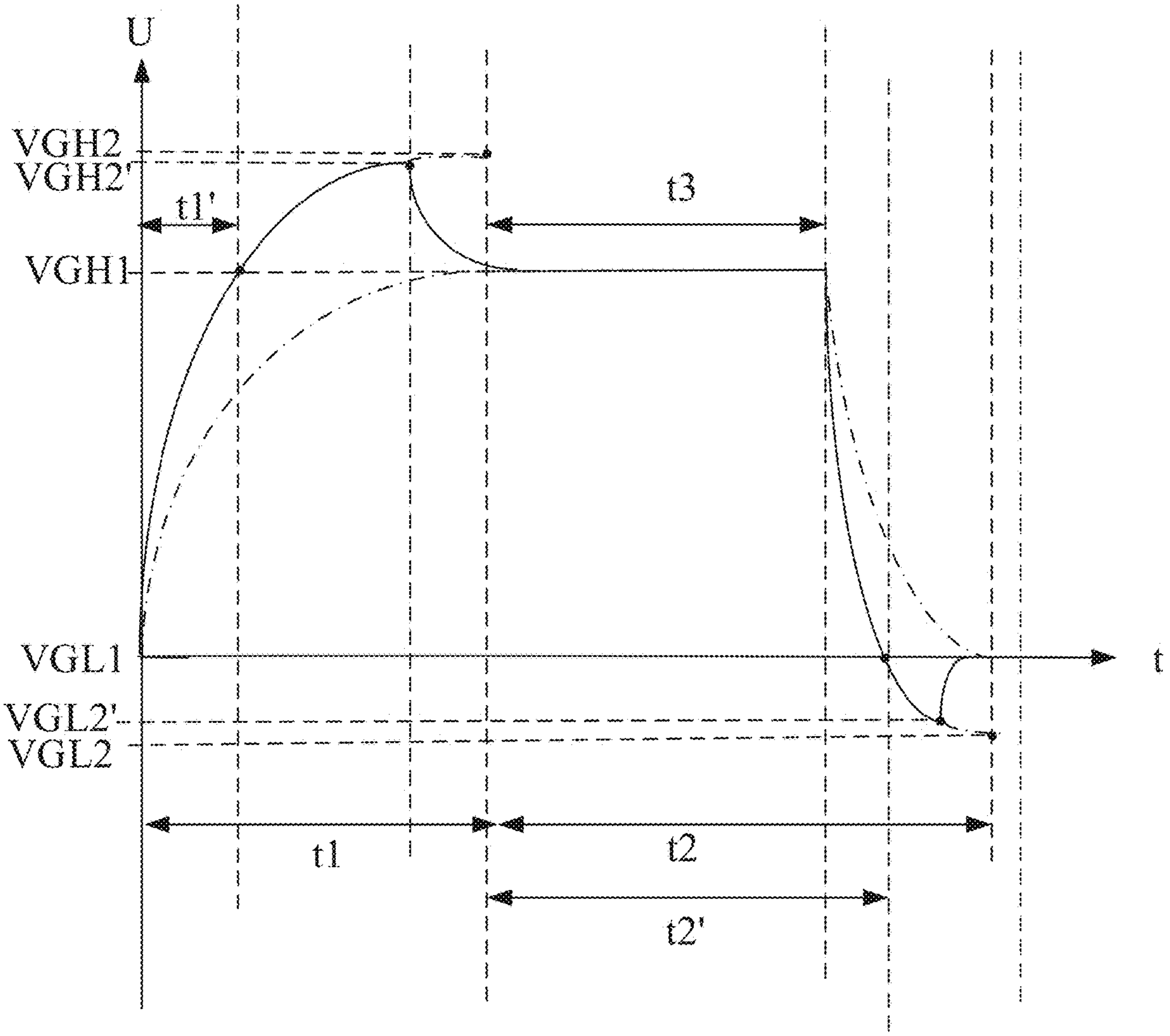
FIG. 6 is a third schematic timing diagram of a gate signal in a driving method a GOA circuit provided by an embodiment of the present invention.

In FIGS. 4, 5, and 6, solid lines represent a schematic timing diagram of a gate signal in a driving method of the GOA circuit provided by the embodiments of the present invention, dotted lines represent a schematic timing diagram of a conventional gate signal, and dotted lines represent positions corresponding to each of the abscissa and ordinate.

In this embodiment of the present invention, for a same gate driver, a driving capability of the GOA circuit included in the gate driver remains unchanged. Under the same driving capability, if a time period required for the gate signal to rise from the first low potential VGL1 to the first high potential VGH1 is a first preset time period t1, a waveform of the gate signal rising from the first low potential VGL1 to a highest potential higher than the first high potential VGH1 is steeper than a waveform rising to the first high potential VGH1 at a highest level, that is, a slope is greater. Therefore, when the gate signal rises to a second high potential VGH2 at a highest level, a time period t1' actually required for the gate signal to rise to the first high potential VGH1 is shorter than the first preset time period t1. That is to say, if, within the same first preset time period t1, the gate signal rising from the first low potential VGL1 to the second high potential VGH2 at the highest level is compared with the gate signal rising from the first low potential VGL1 to the first high potential VGH1, a time required for the gate signal to rise from the first low potential VGL1 to a turn-on potential of the pixel unit, that is, the first high potential VGH1, is reduced. As a result, the pixel units in the display area of the display panel can be charged faster and earlier, thereby improving a charging rate of the pixel units.

Likewise, if a time period required for the gate signal to fall from the first high potential VGH1 to the first low potential VGL1 is a second preset time period t2, a waveform of the gate signal falling from the first high potential VGH1 to a potential at a lowest level lower than the first low potential VGL1 is steeper than a waveform falling to the first low potential VGL1 at a lowest level, that is, a slope is greater. Therefore, when the gate signal falls to a second low potential VGL2 at a lowest level, a time period t2' actually required for the gate signal to fall to the first low potential VGL1 is shorter than the second preset time period t2. That is to say, if, within the same first preset time period t1, the gate signal falling from the first high potential VGH1 to the second low potential VGH2 at the lowest level is compared with the gate signal falling from the first high potential VGH1 to the first low potential VGL1, a time required for the gate signal to fall from the first high potential VGH1 to a turn-off potential of the pixel unit, that is, the first low potential VGL1, is reduced. As a result, the pixel units in the display area of the display panel can be turned off faster and earlier, thereby reducing a risk of wrong charging of the pixel units.

As shown in FIG. 4, an embodiment of the present invention provides a driving method of a GOA circuit, including: enabling a gate signal to rise sequentially from a first low potential VGL1 to a first high potential VGH1 and a second high potential VGH2 within a first preset time period t1 in a turn-on phase of each of rows of pixel units. The second high potential VGH2 is higher than the first high potential VGH1, and the first high potential VGH1 is higher than the first low potential VGL1; specifically, the first preset time period t1 is a time period required for the gate signal to rise from the first low potential VGL1 to the first high potential VGH1 at a highest level, and the first high potential VGH1 is a turn-on potential of each of the pixel units, and the first low potential VGL1 is a turn-off potential of each of the pixel units.

That is, in the driving method of the GOA circuit provided by the embodiment of the present invention, within the first preset time period t1 required for the gate signal to rise from the first low potential VGL1 to the first high potential VGH1, the gate signal is enabled to rise from the first low potential VGL1 to the first high potential VGH1 and the second high potential VGH2 sequentially, thereby reducing a time period for the gate signal to rise from the first low potential VGL1 to the first high potential VGH1. As a result, the pixel units in the display area of the display panel can be charged faster and earlier, thereby improving a charging rate of the pixel units.

Please continue to refer to FIG. 4, the driving method of the GOA circuit further includes: enabling the gate signal to fall from the second high potential VGH2 to a second low potential VGL2 and then rise from the second low potential VGL2 to the first low potential VGL1 within a second preset time period t2 in a turn-off phase of each row of the pixel units. The second low potential is lower than the first low potential. Specifically, the second preset time period t2 is a time period required for the gate signal to fall from the first high potential VGH1 to the first low potential VGL1 at a lowest level.

That is, in the driving method of the GOA circuit provided by the embodiment of the present invention, within the second preset time period t2 required for the gate signal to fall from the first high potential VGH1 to the first low potential VGL1, the gate signal is enabled to rise from the second low potential VGL2 to the first low potential VGL1 after falling from the first high potential VGH1 to the second low potential VGL2, thereby reducing a time period for the gate signal to fall from the first high potential VGH1 to the first low potential VGL1. As a result, the pixel units in the display area of the display panel can be turned off faster and earlier, thereby reducing a risk of wrong charging of the pixel units.

Further, if the gate signal is kept at the second high potential VGH2 for charging during the turn-on phase of the pixel unit, power consumption of the GOA circuit will increase, thereby increasing the power consumption of the display panel. Therefore, in this embodiment of the present invention, after the gate signal reaches the second high potential VGH2, the gate signal is lowered from the second high potential VGH2 to the first high potential VGH1 and then remains stable for a third preset time period t3, so that the pixel unit continues to charge. The third preset time period t3 is a charging time period when each pixel unit is thoroughly turned on. Likewise, if the gate signal is kept at the second low potential VGL2 in the turn-off phase of the pixel unit, the power consumption of the GOA circuit and the display panel will also be increased. Therefore, after the gate signal reaches the second low potential VGL2, the gate signal is further enabled to rise from the second low potential VGL2 to the first low potential VGL1.

Specifically, in terms of a waveform of a gate signal output by a GOA circuit configured in a gate driver, the waveform of the gate signal is generally set by directly setting potentials of the gate signal. That is, the waveform of the gate signal is actually set by setting the potentials of the second high potential VGH2 and the second low potential VGL2. However, since it is difficult to determine the potentials of the second high potential VGH2 and the second low potential VGL2 in advance, a highest potential reached by the gate signal actually set may be higher or lower than the potential of the second high potential VGH2 in FIG. 4, while a lowest potential reached by the gate signal actually set may be higher or lower than the potential of the second low potential VGL2 in FIG. 4. In addition, it can be understood that the highest potential reached by the gate signal actually set is higher than the first high potential VGH1, and the lowest potential reached by the gate signal actually set is lower than the first low potential VGL1.

Specifically, when the gate signal actually set reaches a highest potential higher than the second high potential VGH2 in FIG. 4, or when the gate signal actually set reaches a lowest potential lower than the second low potential VGL2 in FIG. 4, for example, as shown in FIG. 5, the highest potential reached by the gate signal actually set is a third high potential VGH3 higher than the second high potential VGH2, so a time period of rising from the first low potential VGL1 to the third high potential VGH3 is longer than the first preset time period t1. During the first preset time period t1, the gate signal rises from the first low potential VGL1 to the first high potential VGH1 and the third high potential VGH3 in sequence, so a time period t1' required for the gate signal to actually rise from the first low potential VGL1 to the first high potential VGH1 is shorter than the first preset time period t1. That is, the time period for the gate signal rising from the first low potential VGL1 to the first high potential VGH1 is reduced; likewise, the lowest potential reached by the gate signal actually set is a third low potential VGL3 lower than the second low potential VGL2, so a time period of falling from the first high potential VGH1 to the third low potential VGL3 is longer than the second preset time period t2. During the second preset time period t2, the gate signal falls from the first high potential VGH1 to the third low potential VGL3, and then rises from the third low potential VGL3 to the first low potential VGL1, so a time period t2' required for the gate signal to actually fall from the first high potential VGH1 to the first low potential VGL1 is shorter than the second preset time period t2. That is, the time period of the gate signal falling from the first high potential VGH1 to the first low potential VGL1 is reduced.

When the gate signal actually set reaches the highest potential lower than the second high potential VGH2 in FIG. 4, or when the gate signal actually set reaches the lowest potential higher than the second low potential VGL2 in FIG. 4, for example, as shown in FIG. 6, a highest potential reached by the gate signal actually set is a second actual high potential VGH2' lower than the second high potential VGH2, so a time period of rising from the first low potential VGL1 to the second actual high potential VGH2' is longer than the first preset time period t1. During the first preset time period t1, the gate signal rises from the first low potential VGL1 to the first high potential VGH1 and the second actual high potential VGH2' in sequence, so a time period t1' required for the gate signal to actually rise from the first low potential VGL1 to the first high potential VGH1 is shorter than the first preset time period t1. That is, the time period for the gate signal rising from the first low potential VGL1 to the first high potential VGH1 is reduced; likewise, the lowest potential reached by the gate signal actually set is a second actual low potential VGL2' higher than the second low potential VGL2, so a time period of falling from the first high potential VGH1 to the second actual low potential VGL2' is shorter than the second preset time period t2. During the second preset time period t2, the gate signal falls from the first high potential VGH1 to the second actual low potential VGL2', and then rises from the second actual low potential VGL2' to the first low potential VGL1, so a time period t2' required for the gate signal to actually fall from the first high potential VGH1 to the first low potential VGL1 is shorter than the second preset time period t2. That is, the time period of the gate signal falling from the first high potential VGH1 to the first low potential VGL1 is reduced.

Based on the above embodiments, an embodiment of the present invention further provides a gate driver, including a GOA circuit configured to output a gate signal. During the outputting of the gate signal, the gate driver is configured to enable the GOA circuit to enable the gate signal to rise sequentially from a first low potential VGL1 to a first high potential VGH1 and a second high potential VGH2 within a first preset time period t1 in a turn-on phase of each of rows of pixel units, wherein the second high potential VGH2 is higher than the first high potential VGH1, and the first high potential VGH1 is higher than the first low potential VGL1. Specifically, the first preset time period t1 is a time period required for the gate signal to rise from the first low potential VGL1 to the first high potential VGH1 at a highest level, and the first high potential VGH1 is a turn-on potential of each of the pixel units, and the first low potential VGL1 is the turn-off potential of each of the pixel units.

In some embodiments, during the outputting of the gate signal, the gate driver is configured to enable the GOA circuit to enable the gate signal to fall from the second high potential VGH2 to the first low potential VGL1 and a second low potential VGL2 in sequence within a second preset time period t2 in a turn-off phase of each row of the pixel units, wherein the second low potential VGL2 is lower than the first low potential VGL1. Specifically, the second preset time period t2 is a time period required for the gate signal to fall from the first high potential VGH1 to the first low potential VGL1 at a lowest level.

In some embodiments, during the outputting of the gate signal, in the turn-off phase of each row of the pixel units and prior to the gate signal being enabled to fall from the second high potential VGH2 to the first low potential VGL1, the gate driver is further configured to enable the GOA circuit to enable the gate signal to remain at the first high potential for a third preset time period t3 after the gate signal falls from the second high potential VGH2 to the first high potential VGH1, wherein the third preset time period t3 is a charging time period for thoroughly turning on each of the pixel units.

In some embodiments, during the outputting of the gate signal, the gate driver is further configured to enable the GOA circuit to enable the gate signal to rise from the second low potential VGL2 to the first low potential VGL1 after the turn-off phase of each row of the pixel units.

Based on the above-mentioned embodiments, the embodiments of the present invention further provide a display panel, including the above-mentioned gate driver. The working principle and beneficial effects of the display panel and the gate driver are the same. Since the gate driver has been described in detail in the above-mentioned embodiments, it will not be repeated here.

It can be understood that for those of ordinary skill in the art, equivalent substitutions or changes can be made according to the technical solution and inventive concept of the present application, and all these changes or substitutions should fall within the protection scope of the appended claims of the present application.

What is claimed is:

1. A driving method of a gate driver on array (GOA) circuit, comprising: enabling a gate signal to rise sequentially from a first low potential to a first high potential and a second high potential within a first preset time period in a turn-on phase of each of rows of pixel units, wherein the second high potential is higher than the first high potential, and the first high potential is higher than the first low potential; wherein the first preset time period is a time period required for the gate signal to rise from the first low potential to the first high potential at a highest level, and the first high potential is a turn-on potential of each of the pixel units, and the first low potential is the turn-off potential of each of the pixel units, enabling the gate signal to fall from the second high potential to a second low potential and then rise from the second low potential to the first low potential within a second preset time period in a turn-off phase of each row of the pixel units, wherein the second low potential is lower than the first low potential; and wherein the second preset time period is a time period required for the gate signal to fall from the first high potential to the first low potential at a lowest level, and wherein between the turn-on phase and the turn-off phase of each row of the pixel units and prior to enabling the gate signal to fall from the second high potential to the first low potential, the driving method further comprises enabling the gate signal to remain at the first high potential for a third preset time period after the gate signal falls from the second high potential to the first high potential, wherein the third preset time period is a charging time period for thoroughly turning on each of the pixel units.

2. The driving method of the GOA circuit of claim 1, further comprising enabling the gate signal to rise from the second low potential to the first low potential after the turn-off phase of each row of the pixel units.

3. The driving method of the GOA circuit of claim 1, wherein the first high potential ranges from 20V to 35V and the first low potential ranges from −5V to −10V.

4. The driving method of the GOA circuit of claim 1, wherein thin-film transistors included in the GOA circuit are each an N-type thin-film transistor.

5. A gate driver, comprising a gate driver on array (GOA) circuit configured to output a gate signal; wherein, during the outputting of the gate signal, the gate driver is configured to enable the GOA circuit to enable the gate signal to rise sequentially from a first low potential to a first high potential and a second high potential within a first preset time period in a turn-on phase of each of rows of pixel units, wherein the second high potential is higher than the first high potential, and the first high potential is higher than the first low potential; and wherein the first preset time period is a time period required for the gate signal to rise from the first low potential to the first high potential at a highest level, the first high potential is a turn-on potential of each of the pixel units, and the first low potential is the turn-off potential of each of the pixel units, wherein, during the outputting of the gate signal, the gate driver is configured to enable the GOA circuit to enable the gate signal to fall from the second high potential to the first low potential and a second low potential in sequence within a second preset time period in a turn-off phase of each row of the pixel units, wherein the second low potential is lower than the first low potential; and wherein the second preset time period is a time period required for the gate signal to fall from the first high potential to the first low potential at a lowest level, and wherein, during the outputting of the gate signal, in the turn-off phase of each row of the pixel units and prior to the gate signal being enabled to fall from the second high potential to the first low potential, the gate driver is further configured to enable the GOA circuit to enable the gate signal to remain at the first high potential for a third preset time period after the gate signal falls from the second high potential to the first high potential, wherein the third preset time period is a charging time period for thoroughly turning on each of the pixel units.

6. The gate driver of claim 5, wherein, during the outputting of the gate signal, the gate driver is further configured to enable the GOA circuit to enable the gate signal to rise from the second low potential to the first low potential after the turn-off phase of each row of the pixel units.

7. The gate driver of claim 5, wherein the first high potential ranges from 20V to 35V and the first low potential ranges from −5V to −10V.

8. The gate driver of claim 5, wherein thin-film transistors included in the GOA circuit are each an N-type thin-film transistor.

9. A display panel, comprising a gate driver, the gate driver comprising a gate driver on array (GOA) circuit for outputting a gate signal; wherein during the GOA circuit is enabled to output the gate signal, the gate driver is configured to enable the gate signal to rise sequentially from a first low potential to a first high potential and a second high potential within a first preset time period in a turn-on phase of each of rows of pixel units, wherein the second high potential is higher than the first high potential, and the first high potential is higher than the first low potential; and wherein the first preset time period is a time period required for the gate signal to rise from the first low potential to the first high potential at a highest level, the first high potential is a turn-on potential of each of the pixel units, and the first low potential is the turn-off potential of each of the pixel units, wherein, during the outputting of the gate signal, the gate driver is configured to enable the GOA circuit to enable the gate signal to fall from the second high potential to the first low potential and a second low potential in sequence within a second preset time period in a turn-off phase of each row of the pixel units, wherein the second low potential is lower than the first low potential; and wherein the second preset time period is a time period required for the gate signal to fall from the first high potential to the first low potential at a lowest level, and wherein, during the outputting of the gate signal, in the turn-off phase of each row of the pixel units and prior to the gate signal being enabled to fall from the second high potential to the first low potential, the gate driver is further configured to enable the GOA circuit to enable the gate signal to remain at the first high potential for a third preset time period after the gate signal falls from the second high potential to the first high potential, wherein the third preset time period is a charging time period for thoroughly turning on each of the pixel units.

10. The display panel of claim 9, wherein, during the outputting of the gate signal, the gate driver is further configured to enable the GOA circuit to enable the gate signal to rise from the second low potential to the first low potential after the turn-off phase of each row of the pixel units.

11. The display panel of claim 9, wherein the first high potential ranges from 20V to 35V and the first low potential ranges from −5V to −10V.

12. The display panel of claim 9, wherein thin-film transistors included in the GOA circuit are each an N-type thin-film transistor.

* * * * *